US010592097B2

(12) United States Patent
Ishihara

(10) Patent No.: US 10,592,097 B2
(45) Date of Patent: Mar. 17, 2020

(54) ELECTRONIC APPARATUS EQUIPPED WITH A TOUCH OPERATION SECTION

(71) Applicant: CASIO COMPUTER CO., LTD., Shibuya-ku, Tokyo (JP)

(72) Inventor: Masanori Ishihara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/047,422

(22) Filed: Feb. 18, 2016

(65) Prior Publication Data

US 2016/0259543 A1 Sep. 8, 2016

(30) Foreign Application Priority Data

Mar. 5, 2015 (JP) .................. 2015-043064

(51) Int. Cl.
*G06F 3/0488* (2013.01)
*G06F 3/041* (2006.01)
(Continued)

(52) U.S. Cl.
CPC ........ *G06F 3/04883* (2013.01); *G06F 1/1675* (2013.01); *G06F 3/03547* (2013.01);
(Continued)

(58) Field of Classification Search
CPC ............... G06F 3/04883; G06F 3/0416; G06F 3/04817; G06F 3/0482; G06F 3/0488;
(Continued)

(56) References Cited

U.S. PATENT DOCUMENTS 8,296,684 B2    10/2012 Duarte et al.
8,704,774 B2 *  4/2014 Chang .................. G06F 3/0488
                                                345/173
(Continued)

FOREIGN PATENT DOCUMENTS

CN    103809901 A    5/2014
CN    103984497 A    8/2014
(Continued)

OTHER PUBLICATIONS

Chinese Office Action (and English language translation thereof) dated Sep. 5, 2018 issued in Chinese Application No. 201610124308.6.

(Continued)

*Primary Examiner* — Dismery Mercedes
(74) *Attorney, Agent, or Firm* — Holtz, Holtz & Volek PC

(57) ABSTRACT

In order to achieve comfortable operations while appropriately preventing incorrect operations by unintentional touch operations on a touch operation section, when a touch operation performed on the touch operation section such as a selfie pad is a predetermined touch operation such as a double tap operation different from a touch operation such as a single tap or slide operation for giving an instruction to perform a predetermined function, switching is performed between a first state that is a selfie pad restricted state for restricting the predetermined function capable of being performed by the touch operation on the selfie pad and a second state that is a selfie pad restriction released state for releasing the restriction of the predetermined function.

8 Claims, 10 Drawing Sheets

WHEN FRAME BLOCK IS CLOSED

(51) Int. Cl.
*G06F 3/0482* (2013.01)
*G06F 3/0484* (2013.01)
*G06F 3/0354* (2013.01)
*G06F 3/0481* (2013.01)
*G06F 1/16* (2006.01)

(52) U.S. Cl.
CPC ............ *G06F 3/041* (2013.01); *G06F 3/0416* (2013.01); *G06F 3/0482* (2013.01); *G06F 3/04817* (2013.01); *G06F 3/04842* (2013.01); *G06F 2200/1636* (2013.01); *H04M 2250/22* (2013.01)

(58) Field of Classification Search
CPC ................ G06F 3/017; G06F 3/04842; G06F 2203/04104; G06F 1/3231; G06F 9/44; G06F 3/041; G06F 3/048; G06F 3/03547; G06F 2221/2147; G06F 2221/2149; G06F 21/36; G06F 1/1675; H04M 2250/22; H04M 1/72522; H04M 1/72577; H04M 1/72583
See application file for complete search history.

(56) References Cited

U.S. PATENT DOCUMENTS

| | | | |
|---|---|---|---|
| 9,094,603 B2 | 7/2015 | Ishihara et al. | |
| 9,171,506 B2 | 10/2015 | Ishihara et al. | |
| 9,213,822 B2* | 12/2015 | Dellinger | G06F 21/6218 |
| 9,261,992 B2 | 2/2016 | Ma et al. | |
| 9,323,444 B2* | 4/2016 | Nishio | G06F 3/04883 |
| 9,395,833 B2* | 7/2016 | Lee | G06F 3/04883 |
| 9,489,107 B2 | 11/2016 | Duarte et al. | |
| 9,632,578 B2 | 4/2017 | Bae et al. | |
| 9,830,075 B2* | 11/2017 | Kim | G06F 3/04817 |
| 9,952,681 B2 | 4/2018 | Bae et al. | |
| 2007/0273665 A1* | 11/2007 | Park | G06F 3/0416 |
| | | | 345/173 |
| 2008/0055276 A1* | 3/2008 | Chang | G06F 3/0488 |
| | | | 345/175 |
| 2009/0241072 A1* | 9/2009 | Chaudhri | G06F 3/04883 |
| | | | 715/863 |
| 2009/0251434 A1* | 10/2009 | Rimon | G06F 1/30 |
| | | | 345/173 |
| 2009/0293007 A1 | 11/2009 | Duarte et al. | |
| 2010/0064261 A1* | 3/2010 | Andrews | G06F 3/04883 |
| | | | 715/863 |
| 2010/0269040 A1* | 10/2010 | Lee | G06F 3/04817 |
| | | | 715/702 |
| 2012/0009896 A1* | 1/2012 | Bandyopadhyay | G06F 1/1643 |
| | | | 455/411 |
| 2012/0084711 A1 | 4/2012 | Duarte et al. | |
| 2012/0084734 A1* | 4/2012 | Wilairat | G06F 21/36 |
| | | | 715/863 |
| 2013/0007653 A1* | 1/2013 | Stolyarov | G06F 1/1626 |
| | | | 715/784 |
| 2013/0082945 A1* | 4/2013 | Jo | H04M 1/67 |
| | | | 345/173 |
| 2013/0111415 A1* | 5/2013 | Newman | G06F 1/3203 |
| | | | 715/864 |
| 2013/0169573 A1* | 7/2013 | Nishio | G06F 3/04883 |
| | | | 345/173 |
| 2013/0205210 A1* | 8/2013 | Jeon | G06F 3/04883 |
| | | | 715/716 |
| 2013/0222338 A1* | 8/2013 | Gim | G06F 3/041 |
| | | | 345/174 |
| 2013/0298057 A1 | 11/2013 | Duarte et al. | |
| 2014/0055369 A1* | 2/2014 | Li | G06F 3/0488 |
| | | | 345/173 |
| 2014/0132538 A1 | 5/2014 | Ma et al. | |
| 2014/0157125 A1* | 6/2014 | Seo | G06F 3/0488 |
| | | | 715/716 |
| 2014/0165000 A1* | 6/2014 | Fleizach | H04M 19/04 |
| | | | 715/810 |
| 2014/0292649 A1 | 10/2014 | Bae et al. | |
| 2015/0089449 A1* | 3/2015 | Yeh | G06F 21/00 |
| | | | 715/825 |
| 2015/0181110 A1 | 6/2015 | Ishihara et al. | |
| 2015/0195789 A1* | 7/2015 | Yoon | G06F 3/0488 |
| | | | 345/173 |
| 2015/0229836 A1 | 8/2015 | Ishihara et al. | |
| 2015/0264169 A1* | 9/2015 | Yim | H04M 1/72563 |
| | | | 455/411 |
| 2015/0304548 A1 | 10/2015 | Ishihara et al. | |
| 2016/0006862 A1* | 1/2016 | Park | H04M 1/72577 |
| | | | 455/411 |
| 2017/0205894 A1 | 7/2017 | Bae et al. | |

FOREIGN PATENT DOCUMENTS

| | | |
|---|---|---|
| CN | 104077046 A | 10/2014 |
| CN | 104169859 A | 11/2014 |
| JP | H11203045 A | 7/1999 |
| JP | 2007325051 A | 12/2007 |
| JP | 2010244240 A | 10/2010 |
| JP | 2013200876 A | 10/2013 |
| JP | 2013238955 A | 11/2013 |
| JP | 2014010481 A | 1/2014 |
| JP | 2014075093 A | 4/2014 |

OTHER PUBLICATIONS

Japanese Office Action dated Dec. 25, 2018 (and English translation thereof) issued in counterpart Japanese Application No. 2015-043064.

* cited by examiner

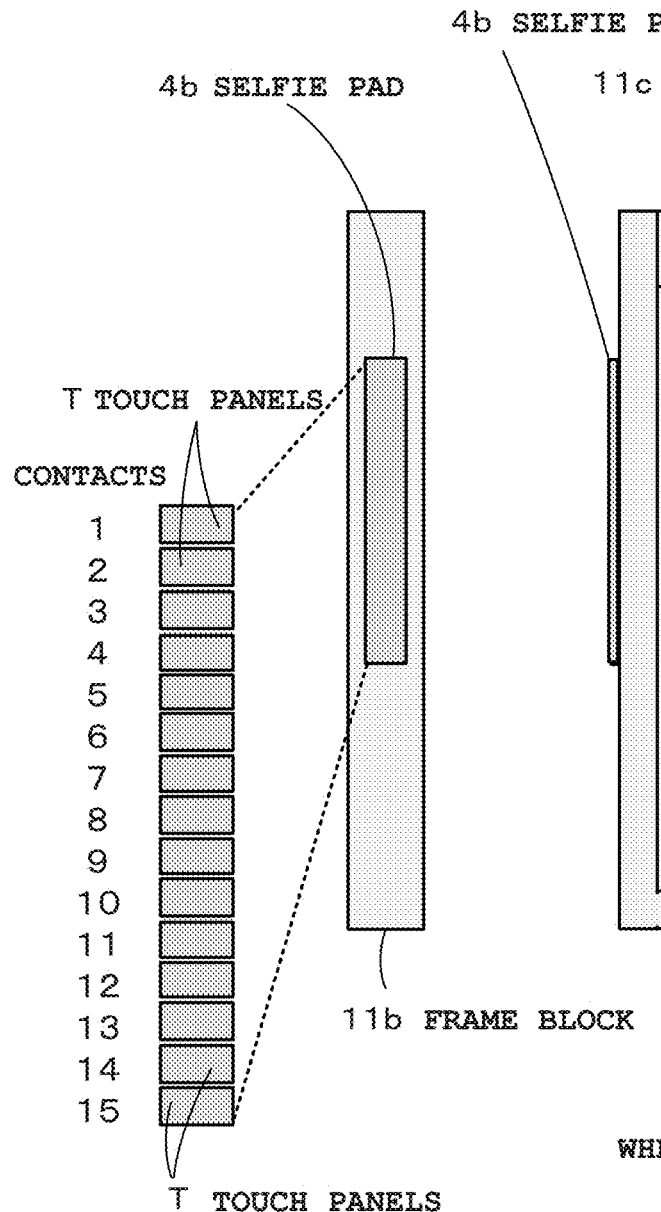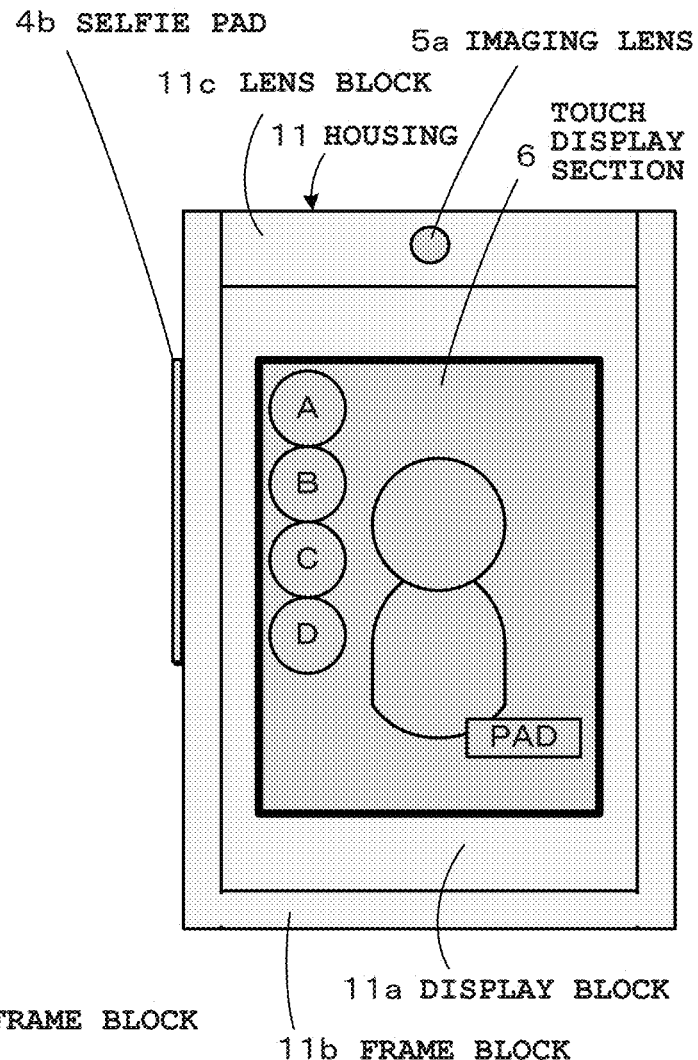

WHEN FRAME BLOCK IS OPEN

FIG. 4

3C SELFIE PAD FUNCTION TABLE

| MODE | FUNCTION | TOUCH OPERATION TO BE DETECTED | PROCESSING TO BE PERFORMED | ANOTHER RELEVANT OPERATOR (HARD KEY/TOUCH KEY) | FUNCTION TO BE PERFORMED |
|---|---|---|---|---|---|
| REC MODE | RELEASE | SLIDE (UPWARD/DOWNWARD) | SELF TIMER PHOTOGRAPHING INSTRUCTION | RELEASE KEY IN SELF TIMER MODE | |
| | ZOOM ADJUSTMENT | UPWARD SLIDE | ZOOM ADJUSTMENT IN TELEPHOTO DIRECTION | T KEY (ZOOM ADJUSTMENT) | |
| | | DOWNWARD SLIDE | ZOOM ADJUSTMENT IN WIDE-ANGLE DIRECTION | W KEY (ZOOM ADJUSTMENT) | |
| | IMAGE PROCESSING | UPWARD SLIDE | SELECT IMMEDIATELY-PRECEDING IMAGE PROCESSING | NONE | ○ |
| | | DOWNWARD SLIDE | SELECT NEXT IMAGE PROCESSING | | |
| PLAY MODE | IMAGE FORWARDING | UPWARD SLIDE | SWITCH DISPLAY TO IMMEDIATELY-PRECEDING IMAGE | LEFT ARROW KEY | |
| | | DOWNWARD SLIDE | SWITCH DISPLAY TO NEXT IMAGE | RIGHT ARROW KEY | |
| | ENLARGED DISPLAY | SINGLE TAP | SWITCH BETWEEN ENLARGED DISPLAY AND NORMAL DISPLAY OF IMAGE BEING DISPLAYED | T KEY (ZOOM ADJUSTMENT) | ○ |

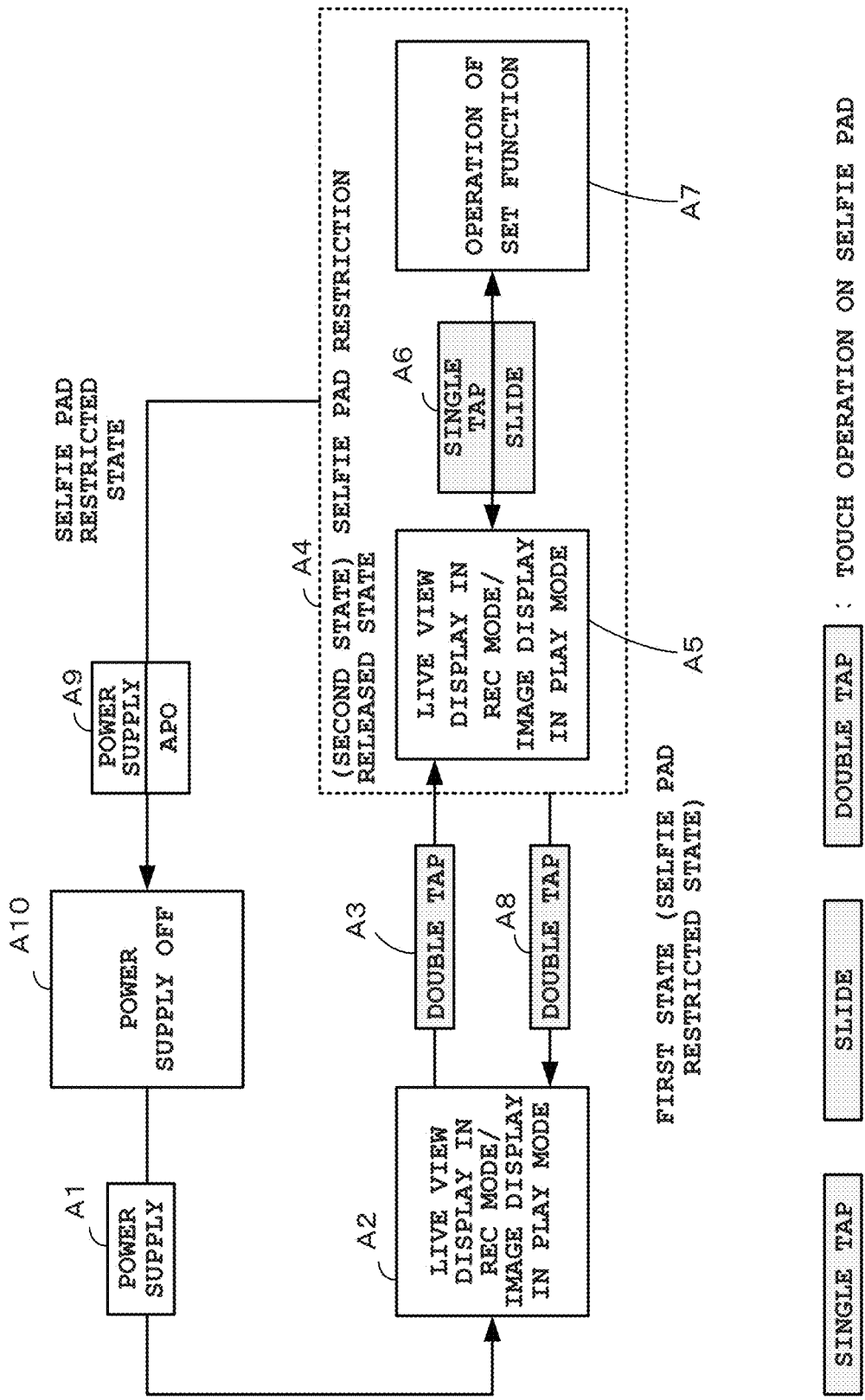

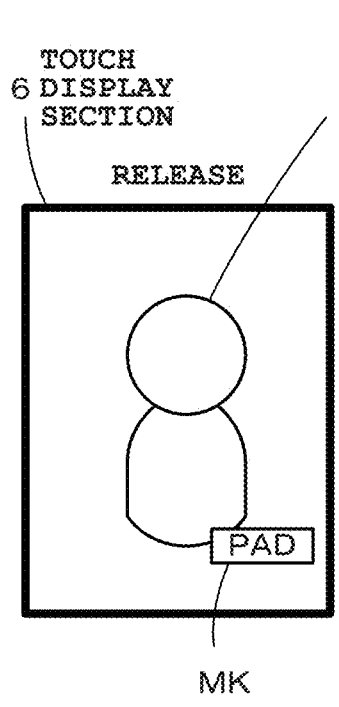
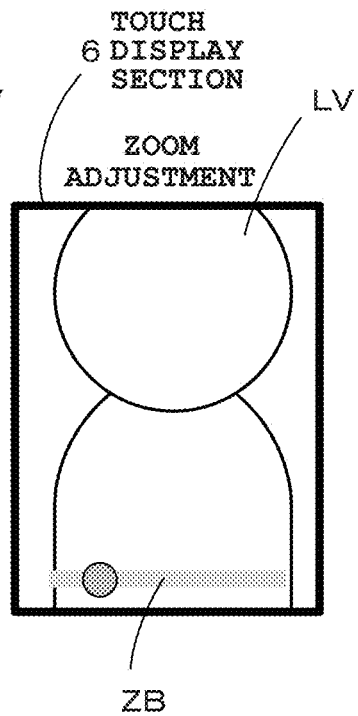
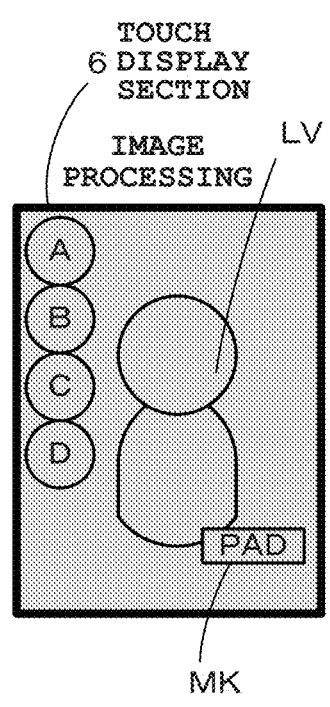
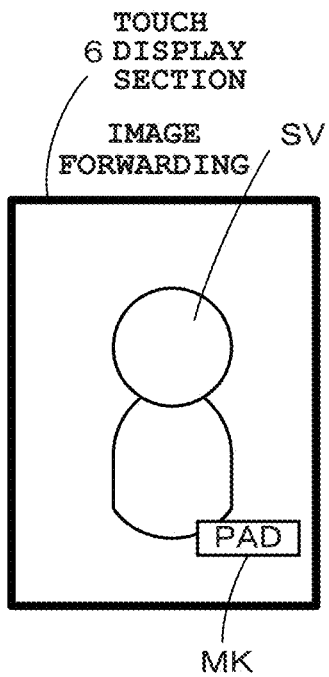
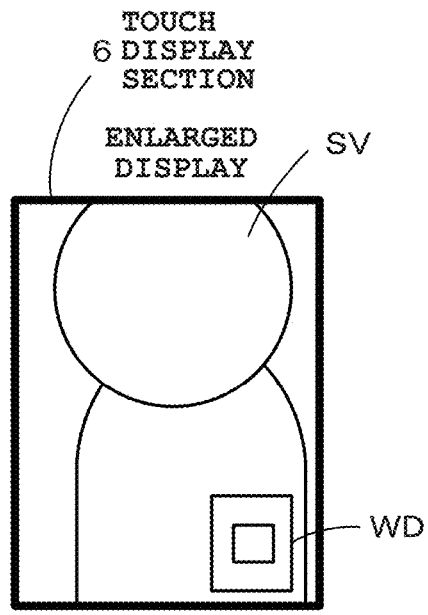

FIG. 7

3C SELFIE PAD FUNCTION TABLE

| MODE | FUNCTION | STATE TRANSITION TOUCH OPERATION | TOUCH OPERATION TO BE DETECTED | PROCESSING TO BE PERFORMED | ANOTHER RELEVANT OPERATOR (HARD KEY/TOUCH KEY) |
|---|---|---|---|---|---|
| REC MODE | RELEASE | QUADRUPLE TAP (FOUR TAPS) | SLIDE (UPWARD/DOWNWARD) | SELF TIMER PHOTOGRAPHING INSTRUCTION | RELEASE KEY IN SELF TIMER MODE |
| | ZOOM ADJUSTMENT | TRIPLE TAP (THREE TAPS) | UPWARD SLIDE | ZOOM ADJUSTMENT IN TELEPHOTO DIRECTION | T KEY (ZOOM ADJUSTMENT) |
| | | | DOWNWARD SLIDE | ZOOM ADJUSTMENT IN WIDE-ANGLE DIRECTION | W KEY (ZOOM ADJUSTMENT) |
| | IMAGE PROCESSING | DOUBLE TAP | UPWARD SLIDE | SELECT IMMEDIATELY-PRECEDING IMAGE PROCESSING | NONE |
| | | | DOWNWARD SLIDE | SELECT NEXT IMAGE PROCESSING | |
| | IMAGE FORWARDING | TRIPLE TAP (THREE TAPS) | UPWARD SLIDE | SWITCH DISPLAY TO IMMEDIATELY-PRECEDING IMAGE | LEFT ARROW KEY |
| | | | DOWNWARD SLIDE | SWITCH DISPLAY TO NEXT IMAGE | RIGHT ARROW KEY |
| PLAY MODE | ENLARGED DISPLAY | DOUBLE TAP | SINGLE TAP | SWITCH BETWEEN ENLARGED DISPLAY AND NORMAL DISPLAY OF IMAGE BEING DISPLAYED | T KEY (ZOOM ADJUSTMENT) |

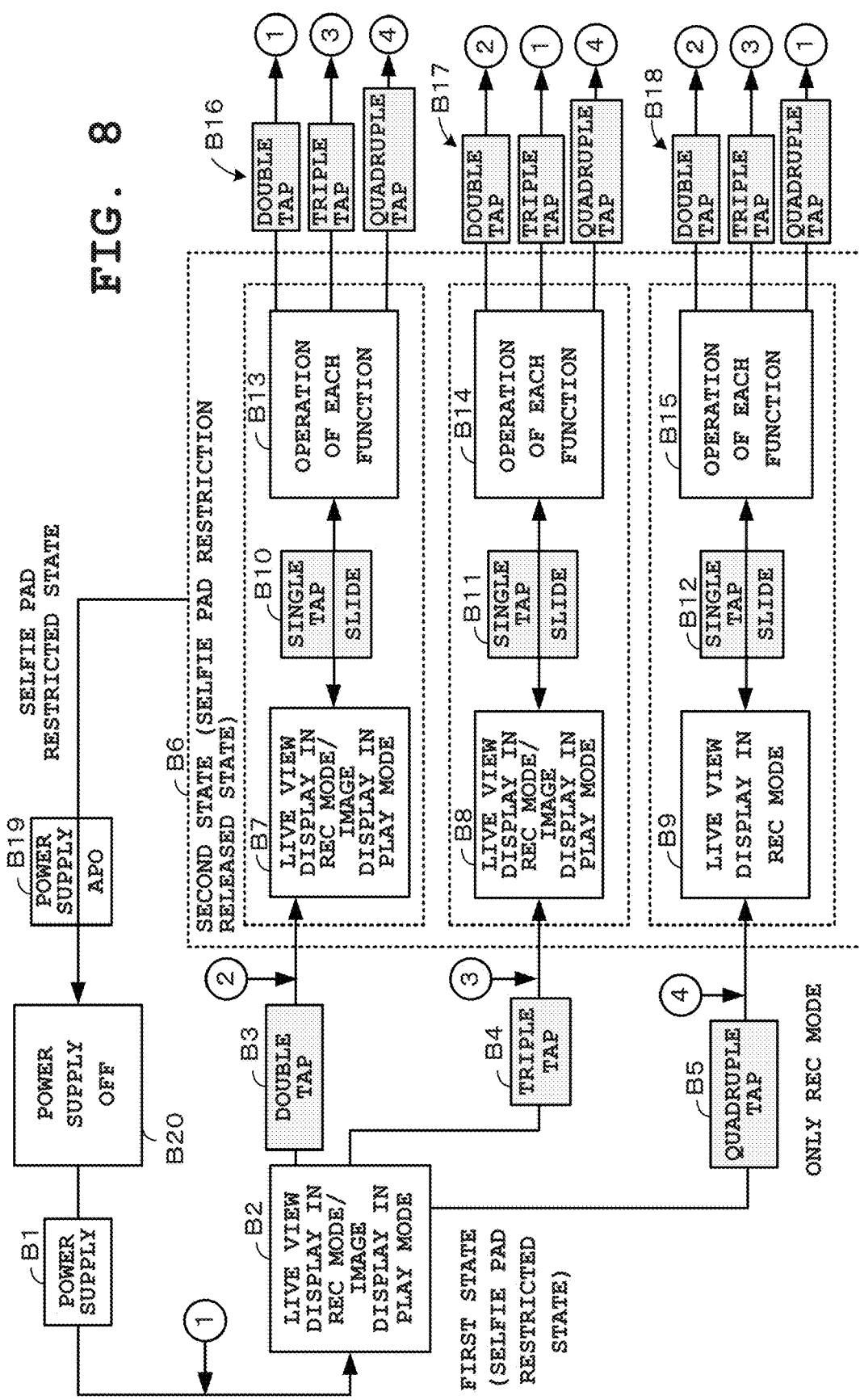

FIG. 9

3C SELFIE PAD FUNCTION TABLE

| MODE | FUNCTION | TOUCH OPERATION TO BE DETECTED | PROCESSING TO BE PERFORMED | FUNCTION TO BE PERFORMED | ANOTHER RELEVANT OPERATOR (HARD KEY/TOUCH KEY) |
|---|---|---|---|---|---|
| REC MODE | RELEASE | CONTACTS 1 TO 5 (DOUBLE TAP 1) | SLIDE (UPWARD/DOWNWARD) | SELF TIMER PHOTOGRAPHING INSTRUCTION | RELEASE KEY IN SELF TIMER MODE |
| | ZOOM ADJUSTMENT | CONTACTS 6 TO 10 (DOUBLE TAP 2) | UPWARD SLIDE | ZOOM ADJUSTMENT IN TELEPHOTO DIRECTION | T KEY (ZOOM ADJUSTMENT) |
| | | | DOWNWARD SLIDE | ZOOM ADJUSTMENT IN WIDE-ANGLE DIRECTION | W KEY (ZOOM ADJUSTMENT) |
| | IMAGE PROCESSING | CONTACTS 11 TO 15 (DOUBLE TAP 3) | UPWARD SLIDE | SELECT IMMEDIATELY-PRECEDING IMAGE PROCESSING | NONE |
| | | | DOWNWARD SLIDE | SELECT NEXT IMAGE PROCESSING | |
| PLAY MODE | IMAGE FORWARDING | CONTACTS 1 TO 5 (DOUBLE TAP 1) | UPWARD SLIDE | SWITCH DISPLAY TO IMMEDIATELY-PRECEDING IMAGE | LEFT ARROW KEY |
| | | | DOWNWARD SLIDE | SWITCH DISPLAY TO NEXT IMAGE | RIGHT ARROW KEY |
| | ENLARGED DISPLAY | CONTACTS 6 TO 10 (DOUBLE TAP 2) | SINGLE TAP | SWITCH BETWEEN ENLARGED DISPLAY AND NORMAL DISPLAY OF IMAGE BEING DISPLAYED | T KEY (ZOOM ADJUSTMENT) |

ELECTRONIC APPARATUS EQUIPPED WITH A TOUCH OPERATION SECTION

CROSS-REFERENCE TO RELATED APPLICATION

This application is based upon and claims the benefit of priority from the prior Japanese Patent Application No. 2015-043064, filed Mar. 5, 2015, the entire contents of which are incorporated herein by reference.

BACKGROUND OF THE INVENTION

1. Field of the Invention

The present invention relates to an electronic apparatus and a touch operation control method.

2. Description of the Related Art

Conventionally, as a technology for an electronic apparatus equipped with a touch operation section allowing a touch operation such as a slide operation, a technology is known in which a slide sensor (touch operation section) is arranged on a side surface of the housing of the electronic apparatus, as disclosed in Japanese Patent Application Laid-Open (Kokai) Publication No. 2013-238955. In this technology, in a case where a user viewing a display screen (touch screen) of an information terminal performs a touch operation with a thumb or the like while holding the housing of the information terminal with the right hand, the slide sensor can be operated only by the user sliding the thumb along a side surface of the housing instead of operating a portion not easily reachable by a finger such as a corner of the display screen. As a result, a user interface that is excellent in operability can be provided.

SUMMARY OF THE INVENTION

In accordance with one aspect of the present invention, there is provided an electronic apparatus equipped with a touch operation section, comprising: a processor that is configured to: judge a type of a touch operation performed on the touch operation section; perform switching between a first state where a predetermined function capable of being performed by the touch operation performed on the touch operation section is restricted and a second state where restriction of the predetermined function is released; and control to perform switching between the first state and the second state when the touch operation is judged as a predetermined touch operation of a type different from a type of a touch operation for giving an instruction to perform the predetermined function.

In accordance with another aspect of the present invention, there is provided an electronic apparatus equipped with a touch operation section, comprising: a processor that is configured to: detect a touch operation performed on the touch operation section; and control such that instruction operations can be performed by a plurality of operation methods including: a first operation method of performing an instruction operation by a first touch operation having a lower possibility of causing an incorrect operation than a second touch operation that is a normal touch operation, among various touch operations to be detected; a second operation method of performing an instruction operation by the second touch operation; and a third operation method of performing an instruction operation by the second touch operation after making the second touch operation effective by performing the first touch operation.

In accordance with another aspect of the present invention, there is provided a touch operation control method for an electronic apparatus equipped with a touch operation section, comprising: judging a type of a touch operation performed on the touch operation section; performing switching between a first state where a predetermined function capable of being performed by the touch operation performed on the touch operation section is restricted and a second state where restriction of the predetermined function is released; and controlling to perform switching between the first state and the second state when the touch operation is judged as a predetermined touch operation of a type different from a type of a touch operation for giving an instruction to perform the predetermined function.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

FIG. 2A is an external front view of the imaging apparatus, which shows a position relation between a touch display section 6 and a selfie pad (touch operation section) 4b and a state where a frame block 11b has been closed with respect to a display block 11a and a lens block 11c;

FIG. 2B is a side view of the state shown in FIG. 2A:

FIG. 4 is a diagram for describing a selfie pad function table 3C;

FIG. 5 is a schematic operation diagram for describing the transition of the operation state of the imaging apparatus;

FIG. 6A to FIG. 6E are diagrams showing screens displayed on the touch display section 6 when processing according to a function is performed;

FIG. 7 is a diagram for describing the selfie pad function table 3C of a second embodiment;

FIG. 8 is a schematic operation diagram for describing the transition of the operation state of the imaging apparatus in the second embodiment;

FIG. 9 is a diagram for describing the selfie pad function table 3C of a third embodiment.

DETAILED DESCRIPTION OF THE PREFERRED EMBODIMENTS

Embodiments of the present invention will hereinafter be described in detail with reference to the drawings.

(First Embodiment)

First, a first embodiment of the present invention is described with reference to FIG. 1 to FIG. 6E.

Figure 1:
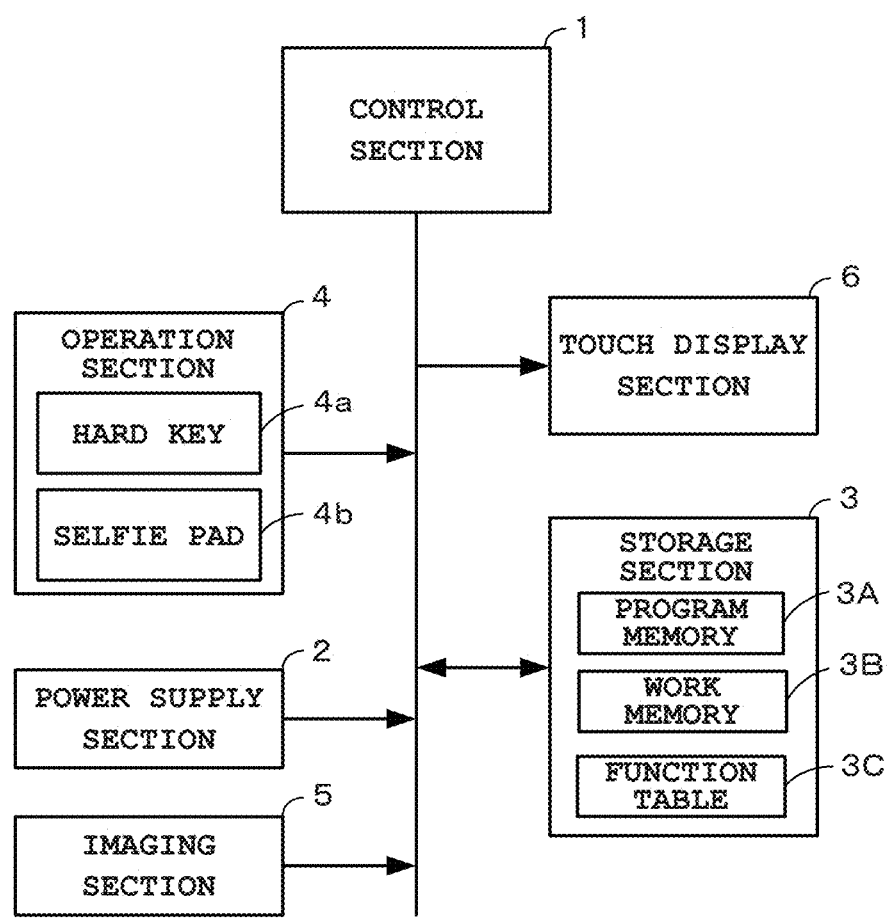
FIG. 1 is a block diagram showing basic components of an imaging apparatus (digital camera) that is an embodiment of an electronic apparatus according to the present invention.

FIG. 1 is a block diagram showing basic components of an imaging apparatus (digital camera) that is an embodiment of an electronic apparatus according to the present invention.

This imaging apparatus (digital camera) includes functions such as an imaging function capable of high-definition imaging of a photographic subject, a clock function for acquiring a current date and time and timer time, and an image playback function for reading and replaying a photographed and recorded/stored image (stored image). A control section 1 in FIG. 1 operates by power supply from a power supply section (secondary battery) 2, and controls the entire operation of this imaging apparatus by following various programs stored in a storage section 3. This control section 1 is provided with a CPU (Central Processing Unit), a memory, and the like not shown in the drawing.

The storage section 3 is structured to include, for example, a ROM (Read Only Memory), a flash memory, and the like, and has a program memory 3A where a program for achieving the present embodiment and various applications are stored, a work memory 3B where a flag and the like are temporarily stored, and a selfie pad function table 3C described later. This storage section 3 may be structured to include a removable portable memory (recording medium) such as an SD (Secure Digital) card or an IC (Integrated Circuit) card, or may be structured to include, although not shown, a storage area on a predetermined server apparatus side in a case where the camera is connected to a network by a communication function.

An operation section 4 in FIG. 1 is structured to have a hard key 4a and a selfie pad 4b. Although omitted in the drawing, the hard key 4a includes various keys such as a power supply key for turning power on or off, a mode change key for switching between, for example, a mode (REC mode) in which image capturing can be performed and a mode for replaying a captured image (stored image) (PLAY mode), a release key for giving an instruction to perform image capturing, a T (telephoto) key (zoom adjustment key), a W (wide-angle) key (zoom adjustment key), and arrow keys for indicating upward, downward, leftward, and rightward directions. For example, the control section 1 performs mode change processing, image capture processing, zoom adjustment processing, and the like in response to the operation of the hard key 4a. The selfie pad 4b, which will be described in detail further below, is a touch operation section arranged on a side surface of a housing constituting the imaging apparatus, and is a user interface by which the user can perform a touch operation such as a tap operation or a slide operation with a finger while holding the housing by hand.

An imaging section 5 in FIG. 1 is capable of high-definition imaging of a photographic subject by forming a subject image from an optical lens at an image sensor such as a CCD (Charge-Coupled Device) or CMOS (Complementary Metal Oxide Semiconductor) not shown, and has a taking lens, the image sensor, a strobe, various sensors, an analog processing section, and a digital processing section. An image captured by the imaging section 5 is subjected to image compression processing in which the image is compressed by the control section 1 so as to be acquired as a file, and then recorded and stored in the recording medium of the storage section 3. A touch display section 6 in FIG. 1, in which a transparent touch operation section has been arranged and laminated on a display section such as a high-definition liquid crystal and various software keys (icons and touch keys) have been allocated and arranged thereon, displays function names of these software keys, and senses a touch operation by a finger or the like so as to input an operation signal in response to the touch operation. A display screen of the touch display section 6 serves as a monitor screen (live view screen) for displaying captured images (live view image) in real time or as a replay screen for replaying the captured images. Note that, although the touch display section 6 is used in the present embodiment, the present invention is not limited to thereto and a display section may be used which is constituted only by a liquid crystal without a laminated touch operation section.

Figure 3:
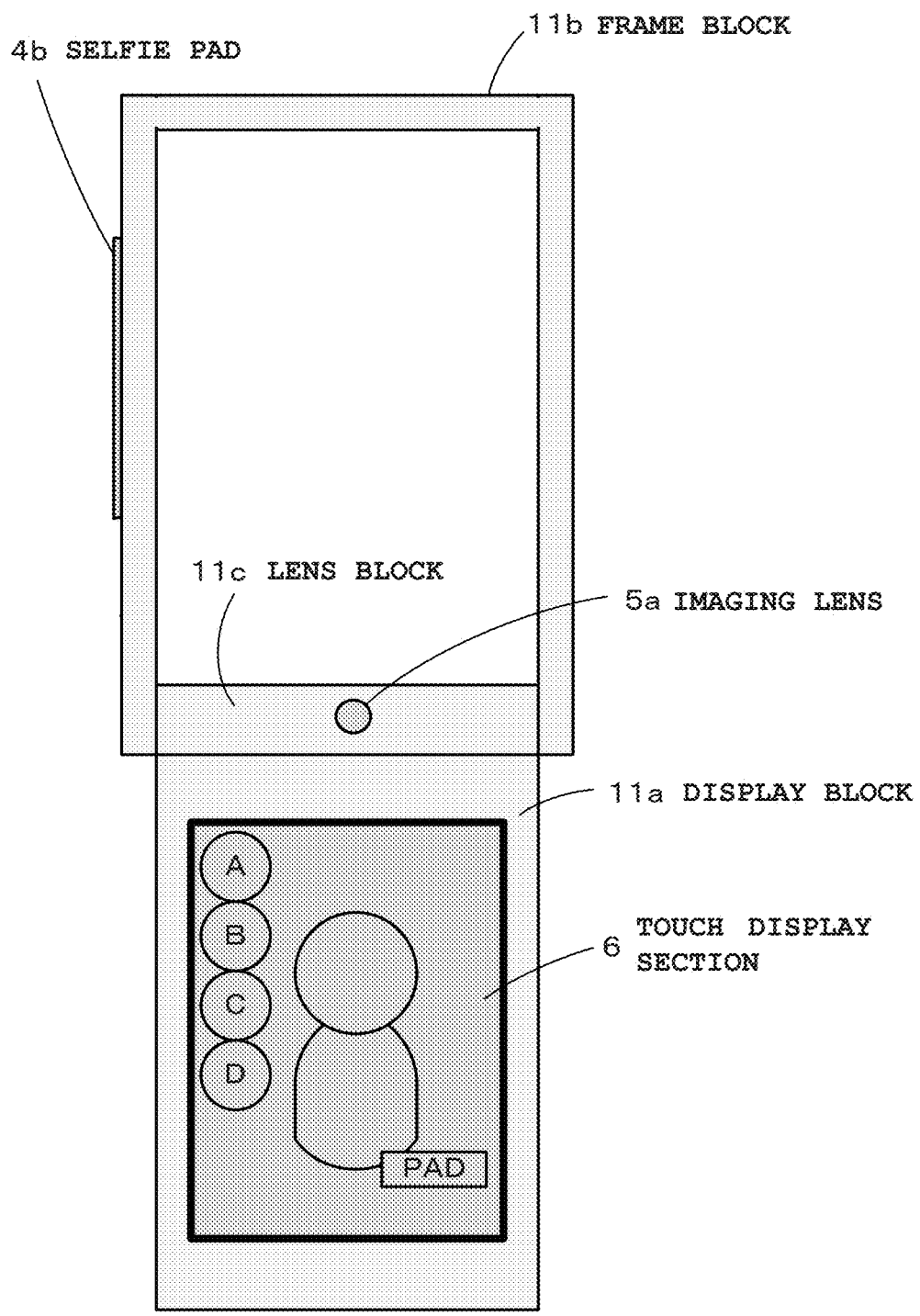
FIG. 3 is an external front view of the imaging apparatus, which shows a position relation between the touch display section 6 and the selfie pad 4b and a state where the frame block 11b has been opened with respect to the display block 11a and the lens block 11c.

FIG. 2A, FIG. 2B, and FIG. 3 are external views of the imaging apparatus for depicting a position relation between the touch display section 6 and the selfie pad (touch operation section) 4b.

FIG. 2A is a front view of the imaging apparatus, and FIG. 2B is a side view thereof. A housing 11 constituting the imaging apparatus has a thin rectangular display block 11a, a rectangular frame-shaped frame block 11b surrounding the perimeter of the display block 11a, and a lens block 11c which couples the display block 11a and the frame block 11b together. A center portion at one end of the display block 11a (an upper-end center portion in the example shown in the drawing) and a center portion at one end of the lens block 11c (a lower-end center portion in the example shown in the drawing) are rotatably attached in a lateral direction via a hinge section (omitted in the drawing) for lateral rotation.

Inner sides at both ends of the frame block 11b (upper-left and upper-right inner sides in the example shown in the drawing) and both ends of the lens block 11c (left-side and right-side portions in the example shown in the drawing) are rotatably attached in a longitudinal direction via a hinge section (omitted in the drawing) for longitudinal rotation. The touch display section 6 is arranged at a center portion of the display block 11a. On one side portion of the frame block 11b (left-side portions in the example shown in the drawing), the selfie pad 4b is arranged. At a center portion of the lens block 11c, an imaging lens 5a which constitutes the imaging section 5 is arranged. As described above, the touch display section 6 on the display block 11a and the selfie pad 4b on the frame block 11b are arranged at different positions. Alternatively, the display block 11a and the lens block 11b may be integrated to form a main body block, and inner sides at both ends of the frame block 11b (upper-left and upper-right inner sides in the example shown in the drawing) and both ends of the main block (left-side and right-side portions in the example shown in the drawing) may be rotatably attached in a longitudinal direction via a hinge section (omitted in the drawing) for longitudinal rotation.

The selfie pad 4b is a touch operation section structured by a plurality of (fifteen in the present embodiment) small-piece-shaped touch panels T being arranged in one column. These touch panels T can be used as a fifteen-point switch and can be used on a curved surface. When the user performs a touch operation on the selfie pad 4b with a finger (for example, a thumb or an index finger) while holding the housing 11 by hand, an operation detection signal in accordance with the touch operation is provided to the control section 1. Then, based on the operation detection signal from the selfie pad 4b, the control section 1 judges the type of the touch operation performed on the selfie pad 4b, or in other words, judges whether a tap operation of tapping with a finger has been performed or a slide operation of moving a finger has been performed. When the operation is a tap operation, the control section 1 detects the number of successive tap operations. When the operation is a slide operation, the control section 1 judges the type of the touch operation by detecting its slide direction (upward slide or downward slide).

Also, when judged that the touch operation performed on the selfie pad 4b is a predetermined touch operation, the control section 1 switches between a first state and a second state in accordance with the touch operation. That is, in a case where a touch operation on the selfie pad 4b for giving an instruction to perform switching between the first state and the second state is a "first touch operation" and a touch operation on the selfie pad 4b for giving an instruction to perform a predetermined function (such as release operation, zoom adjustment, or image forwarding) is a "second touch operation", if the first touch operation, which is different from the second touch operation for giving an instruction to perform a predetermined function, is performed, the control section 1 switches between the first state and the second state. In the first embodiment, the first touch operation is a tap operation of two successive tap operations (double tap) and the second touch operation is one tap operation (single tap operation) or a contact-and-move touch operation (slide operation).

Here, the first state is a selfie pad restricted state for restricting a predetermined function (such as release operation, zoom adjustment, or image forwarding). In this state, even if the second touch operation is performed on the selfie pad 4b, this operation is made ineffective and the predetermined function is restricted. In the first state (selfie pad restricted state), only the first touch operation (double tap operation) on the selfie pad 4b is effective. The second state is a selfie pad restriction released state in which the restriction of the predetermined function is released, and the predetermined function is enabled in response to the second touch operation (single tap operation or slide operation) on the selfie pad 4b. In the second state (selfie pad restriction released state), the first touch operation is also effective in addition to the second touch operation on the selfie pad 4b. That is, in the first state, only a double tap operation is detected. In the second state, a double tap operation is detected in addition to a single tap operation or a slide operation.

As described above, in the first embodiment, every time a double tap operation is performed on the selfie pad 4b, switching is alternately made between the first state and the second state. The reason for using a double tap operation as a switching operation is as follows. That is, a single tap operation or a slide operation on the selfie pad 4b has an extremely high possibility of causing an incorrect operation not intended by the user because the user may touch the selfie pad 4b by hand only by holding the housing 11. However, as compared to a single tap operation or a slide operation, a double tap operation has a low possibility of causing an unintended operation and has a high possibility of reducing incorrect operations.

Note that the state switching operation is not limited to a double tap operation and may be any operation as long as it can reduce incorrect operations. In the drawing, "PAD" in the monitor screen (live view screen) is a mark for identification display indicating that switching has been performed to be in the second state (selfie pad restriction released state). Also, numerals "1" to "15" in the drawing added for descriptive purposes along the selfie pad 4b indicate contact numbers for identifying the respective touch panels T arranged in one column. The selfie pad 4b is structured to have fifteen touch panels T arranged in one column.

FIG. 2A and FIG. 2B depict the state in which the display block 11a has been accommodated in the frame block 11b (in a closed state), and FIG. 3 depicts the state in which the frame block 11b has been rotated from the closed state in a longitudinal direction to be open with respect to the display block 11a and the lens block 11c, so that the apparatus is in a selfie style in which the touch display section 6 and the imaging lens 5a have been oriented in the same direction. From this state, by the display block 11a being rotated in a lateral direction by 180 degrees, the apparatus can be in a normal photographing style in which the touch display section 6 and the imaging lens 5a have been oriented in opposite directions. On the touch display section 6 shown in the drawing, an image captured by the imaging section 5 (live view image) is displayed in real time. On this live view screen (monitor screen), various icons A to D for indicating types of image processing to be performed on the live view image are arranged and displayed.

That is, various icons are displayed on the monitor screen, such as an icon (high-key) A for giving an instruction to perform image processing for overexposure for bright and shiny finishing, an icon (foggy) B for giving an instruction to perform image processing for overall blurring for soft and illusionary finishing, an icon (nostalgia) C for giving an instruction to perform imaging processing for darkening surroundings and changing color tone for nostalgic finishing, and an icon (vivid) D for giving an instruction to perform image processing for enhancing chroma saturation for colorful finishing.

FIG. 4 is a diagram for describing a selfie pad function table 3C.

The selfie pad function table 3C is a table for specifying processing to be performed in response to a touch operation (second touch operation) on the selfie pad 4b in the second state (selfie pad restriction released state), and includes fields of "mode", "function", "touch operation to be detected", "processing to be performed", "another relevant operator", and "function to be performed". "Mode" is a field for storing operation modes of the imaging apparatus. In the example shown in the drawing, "REC mode (photographing mode)" and "PLAY mode (replay mode)" have been stored. "Function" is a field for storing various functions that can be performed by the touch operation (second touch operation) on the selfie pad 4b for each operation mode (REC mode and PLAY mode). In the example shown in the drawing, functions of "release", "zoom adjustment", and "image processing" have been stored for "REC mode", and functions of "image forwarding" and "enlarged display" have been stored for "PLAY mode".

"Touch operation to be detected" is a field indicating which touch operation (second touch operation) is effective for each mode and each function. "Function" and "touch operation to be detected" are not necessarily limited to have a one-to-one relation. For a function including a plurality of processing operations, the relation is a one-to-N (the number of processes) relation. In the example shown in the drawing, for a case where "mode" is "REC mode", "slide (upward/downward)" has been stored for "release" in "function", "upward slide" and "downward slide" have been stored for "zoom adjustment", and "upward slide" and "downward slide" have been stored for "image processing". Also, for a case where "mode" is "PLAY mode", "upward slide" and "downward slide" have been stored for "image forwarding" in "function", and "single tap" has been stored for "enlarged display".

"Processing to be performed" is a field indicating processing that can be performed by a touch operation (second touch operation) on the selfie pad 4b for each mode and each function. "Function" and "processing to be performed" are not necessarily limited to have a one-to-one relation. For a function including a plurality of processing operations, the relation is a one-to-N (the number of processes) relation. In the example shown in the drawing, "self timer photographing instruction" has been stored for a case where "mode" is "REC mode", "function" is "release", and "touch operation to be detected" is "slide (upward/downward)". Also, "zoom adjustment in telephoto direction" has been stored for a case where "function" is "zoom adjustment", "touch operation to be detected" is "upward slide", and "zoom adjustment in wide-angle direction" has been stored for a case where "touch operation to be detected" is "downward slide". Moreover, "select immediately-preceding image processing" has been stored for a case where "function" is "image processing" and "touch operation to be detected" is "upward slide", and "select next image processing" has been stored for a case where "touch operation to be detected" is "downward slide".

Similarly, "switch display to immediately-preceding image" has been stored for a case where "mode" is "PLAY mode", "function" is "image forwarding", and "touch operation to be detected" is "upward slide", and "switch display to next image" has been stored for a case where "touch operation to be detected" is "downward slide". Also, "switch between enlarged display and normal display of image being displayed" has been stored for a case where "function" is "enlarged display" and "touch operation to be detected" is "single tap". "Another relevant operator" is a field indicating another operation (operation other than a touch operation on the selfie pad 4b) for a case where processing that can be performed by a touch operation on the selfie pad 4b can be performed also by another operation (operation of the hard key 4a on the operation section 4 or touch operation on the touch display section 6).

In the example shown in the drawing, this "another relevant operator" is the hard key 4a on the operation section 4. "Release key in self timer mode" has been stored for a case where "mode" is "REC mode" and "processing to be performed" is "self timer photographing instruction", "T key (zoom adjustment)" has been stored for a case where "processing to be performed" is "zoom adjustment in telephoto direction", "W key (zoom adjustment)" has been stored for a case where "processing to be performed" is "zoom adjustment in wide-angle direction", and "none" has been stored for "select immediately-preceding image processing" and "select next image processing". A case where "another relevant operator" is "none" indicates that no operation other than a touch operation on the selfie pad 4b is present, or in other words, only a touch operation on the selfie pad 4b is effective as "processing to be performed".

Similarly, "left arrow key" has been stored for a case where "mode" is "PLAY mode" and "processing to be performed" is "switch display to immediately-preceding image", "right-arrow key" has been stored for a case where "processing to be performed" is "switch display to the next image", and "T key (zoom adjustment)" has been stored for a case where "processing to be performed" is "switch between enlarged display and normal display of image being displayed". In the example shown in the drawing, the operation of the hard key 4a is "another relevant operator". However, a touch operation on the touch display section 6 may be included. For example, as a touch operation on the touch display section 6 when "function" is "image processing", one of the above-described icons A to D may be stored for "another relevant operator" in place of "none".

"Function to be performed" is a field indicating which "function" is effective for each mode when the first state (selfie pad restricted state) is switched to the second state (selfie pad restriction removable state). In the example shown in the drawing, "image processing" in "function" has been selected as "function to be performed" in "REC mode". Therefore, "image processing" is an effective "function". Also, "enlarged display" in "function" has been selected as "function to be performed" in "PLAY mode". Therefore, "enlarged display" is an effective function. A function to be selected as "function to be performed" can be set for each mode by a user operation.

Next, the operation concept of the imaging apparatus in the first embodiment is described with reference to a schematic operation diagram shown in FIG. 5. Here, each function described in the schematic operation diagram is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later.

FIG. 5 is a schematic operation diagram for describing the transition of the operation state of the imaging apparatus. In the following descriptions, the operation of the imaging apparatus is described concretely with reference to display examples in FIG. 6A to FIG. 6E.

First, in response to a power supply ON operation by the power supply key of the hard key 4a (Step A1), the control section 1 causes a live view image to be displayed on the monitor screen (touch display section 6) in the REC mode, which is an initial state after a power supply ON operation (Step A2). Although omitted in the drawing, in this state, switching can be performed between the REC mode and the PLAY mode by a mode key of the hard key 4a. In the PLAY mode, the control section 1 causes the captured image (stored image) to be displayed on the replay screen (touch display section 6). Here, the control section 1 is in the first state (selfie pad restricted state) when a power supply ON operation is performed, in which only a predetermined touch operation on the selfie pad 4b is effective. Accordingly, when a touch operation performed on the selfie pad 4b is the above-described first touch operation (double tap operation) different from the above-described second touch operation (single tap operation or slide operation) for giving an instruction to perform a predetermined function, this first touch operation is effective. If this touch operation is a second touch operation, it is ineffective.

Here, in the "selfie pad restricted state", when the touch operation performed on the selfie pad 4b is the first touch operation, that is, a double tap operation (Step A3), the control section 1 enters the second state (selfie pad restriction released state) (Step A4), which makes "function" selected as "function to be performed" on the selfie pad function table 3C effective and makes "touch operation to be detected" for "function" selected as "function to be performed" on the selfie pad function table 3C in the second touch operation (single tap operation and slide operation) also effective, in addition to the first touch operation. Here, with a live view image being displayed on the monitor screen in the REC mode or with a captured image being displayed on the replay screen in the PLAY mode (Step A5), when the second touch operation (single tap operation or slide operation) is performed (Step A6), the control section 1 refers to "processing to be performed" for "function" selected as "function to be performed" on the selfie pad function table 3C, selects processing associated with the second touch operation, and performs this processing (Step A7).

For example, when "release" has been selected as "function to be performed" in "REC mode", the control section 1 causes a live view image LV to be displayed on the monitor screen of the touch display section 6 together with a "PAD" mark MK for identifying "selfie pad restriction released state" (refer to FIG. 6A). Here, when an upward/downward slide operation is performed on the selfie pad 4b or the release key of the hard key 4a is operated, the control section 1 causes the processing of "self timer photographing instruction" to be performed, starts a counting operation by a self timer, and switches the current screen to a screen indicating that countdown is being performed (omitted in the drawing).

Also, when "zoom adjustment" has been selected as "function to be preformed" in "REC mode", the control section 1 causes a zoom bar ZB for enlargement/reduction scale display to be displayed on the monitor screen together with the live view image LV (refer to FIG. 6B). By the zoom bar ZB being displayed, the transition to the second state can be identified. However, the "PAD" mark MK described above may be displayed together with the zoom bar ZB. In this state, when an upward slide operation/downward slide operation is performed on the selfie pad 4b or the T key (zoom adjustment)/W key (zoom adjustment) of the hard key 4 is operated, the control section 1 performs the processing of "zoom adjustment in telephoto direction"/"zoom adjustment in wide-angle direction", and causes the result of the processing on the live view image to be displayed on the monitor screen.

Moreover, when "image processing" has been selected as "function to be performed" in "REC mode", the control section 1 causes the icon (high-key) A, the icon (foggy) B, the icon (nostalgia) C, and the icon (vivid) D described above as various icons, and the "PAD" mark MK to be displayed on the monitor screen together with the live view image LV (refer to FIG. 6C). In this case, when an upward slide operation is performed on the selfie pad 4b, the control section 1 performs the processing of "select immediately-preceding image processing". For example, the control section 1 selects image processing set in the icon B immediately before the icon C. When a downward slide operation is performed on the selfie pad 4b, the control section 1 performs the processing of "select next image processing". For example, the control section 1 selects image processing set in the icon B next to the icon A and performs this processing.

When "image forwarding" has been selected as "function to be performed" in "PLAY mode", the control section 1 causes a captured image SV to be displayed on the replay screen of the touch display section 6 together with the "PAD" mark MK (refer to FIG. 6D). In this case, when an upward slide operation is performed on the selfie pad 4b, the control section 1 performs the processing of "select immediately-preceding image processing". When a downward slide operation is performed, the control section 1 performs the processing of "select next image processing". When "enlarged display" has been selected as "function to be performed", the control section 1 causes an enlarged portion window WD for guiding which portion of the captured image is enlarged to be displayed together with the enlarged captured image SV (refer to FIG. 6E). By the enlarged portion window WD being displayed, the transition to "selfie pad restriction released state" can be identified. However, the "PAD" mark MK described above may be displayed together with the enlarged portion window WD. Here, when a single tap operation is performed on the selfie pad 4b or the T key (zoom adjustment) of the hard key 4a is operated, the control section 1 performs the processing of "switch between enlarged display and normal display of image being displayed".

In the second state (selfie pad control restricted state), when the touch operation performed on the selfie pad 4b is the first touch operation (double tap operation) (Step A8), the control section 1 enters "selfie pad restricted state" to return to the original screen at Step A2 described above. Also, in the second state, in response to a power supply OFF operation by the hard key 4a or APO (auto power off) function (Step A9), the control section 1 enters the first state to be in a power supply off state (Step A10). Note that the APO (auto power off) is a function for automatically entering a power supply off state when the control section 1 detects that a non-operation state has continued for a predetermined time after transition from the first state to the second state. In conjunction with this APO, transition from the second state to the first state is made.

Here, a method of performing an instruction operation by the first touch operation (double tap operation) having a lower possibility of causing an incorrect operation than that of the second touch operation which is a normal touch operation (such as a single tap operation or a slide operation) among touch operations on the selfie pad 4b is referred to as a first operation method, a method of performing an instruction operation by the second touch operation (single tap operation or slide operation) is referred to as a second operation method, a method of performing an instruction operation by the second touch operation after the second touch operation is made effective by performing the first touch operation is referred to as a third operation method. In the first embodiment, instruction operations can be performed by these operation methods (first to third operation methods), as described above.

Also, a method of making the second operation method effective by the above-described first operation method (first touch operation) and then making the second operation method ineffective by the first operation method (first touch operation) is referred to as a fourth operation method, and a method of making the second operation method effective by the first operation method (first touch operation) and then automatically making the second operation method ineffective when a non-operation state has continued for a predetermined time by the above-described APO function which is an operation other than a touch operation on the selfie pad 4b is referred to as a fifth operation method. In the first embodiment, the second operation method can be made ineffective manually or automatically, as described above. Note that, in the fifth operation method which is achieved on condition that a non-operation state has continued for a predetermined time, the power is not required to be turned off as long as the processing of making the second operation method ineffective is performed.

As described above, in the first embodiment, when judged that the type of a touch operation performed on the touch operation section (selfie pad 4b) is a predetermined touch operation different from a touch operation for giving an instruction to perform a predetermined function, the control section 1 switches between the first state (selfie pad restricted state) for restricting the predetermined function that can be performed by a touch operation on the selfie pad 4b and the second state (selfie pad restriction released state)

for removing the restriction of the predetermined function. As a result of this configuration, a touch operation for giving an instruction to perform a predetermined function can be easily changed to be effective or ineffective. Even if the selfie pad 4b is arranged at a position where incorrect operations easily occur, it is possible to achieve comfortable operations while appropriately preventing incorrect operations by unintentional touch operations.

Also, in the first state, when a touch operation is performed on the selfie pad 4b, the control section 1 detects, as the above-described first touch operation, a touch operation different from a touch operation for giving an instruction to perform a predetermined function. In the second state, the control section 1 detects, as the above-described second touch operation, a touch operation for giving an instruction to perform the predetermined function, in addition to the first touch operation, and thereby judges the type of the touch operation. As a result of this configuration, touch operations can be appropriately judged in accordance with the first state and the second state.

Moreover, the control section refers to the selfie pad function table 3C, selects a predetermined function that can be performed by a touch operation on the selfie pad 4b in the second state from among a plurality of functions, and performs the selected function in the second state. As a result of this configuration, after the first state is changed to the second state, the user's desired function can be selected and performed from among various functions by a convenient touch operation on the selfie pad 4b. In addition, by various functions being set for each mode, a different function for each mode can be selected and performed even with a touch operation of the same type.

Furthermore, among the plurality of selectable functions described above, a part of the functions can be operated only by the selfie pad 4b, and other functions can be operated by the selfie pad 4b and another operation section (the hard key 4a of the operation section 4 or the touch display section 6). Therefore, for example, when "another relevant operator" indicates "none" as shown in FIG. 4, the function can be operated only by the selfie pad 4b. When "another relevant operator" does not indicate "none", the function can be operated by the selfie pad 4b and another operation section, whereby the reduction of incorrect operations and improvement in the operability can be achieved.

Still further, since the identifier such as the "PAD" mark MK, the zoom bar ZB, or the enlarged portion window WD, which makes the state identifiable as the first state or the second state, is displayed on the touch display section 6, the user can easily confirm state switching, which is effectual for the reduction of incorrect operations.

Yet still further, the selfie pad 4b is arranged on a side surface of the housing 11 of the imaging apparatus so that the selfie pad 4b can come in contact with the human body when the user holds the housing 11 of the imaging apparatus to visually recognize display contents on the touch display section 6. Therefore, the user can perform a touch operation on the selfie pad 4b only by holding the housing 11, which makes the imaging apparatus excellent in operability and usability.

Yet still further, the housing 11 of the imaging apparatus is constituted by the display block 11a including the touch display section 6 and the frame block 11b rotatably attached to the lens block 11c coupled to this display block, and the selfie pad 4b is arranged on a side surface of this frame block 11b. Therefore, even if the touch display section 6 and the selfie pad 4b are arranged at different positions, the selfie pad 4b can be appropriately operated.

Yet still further, an instruction operation can be performed by a plurality of operation methods including the first operation method of performing an instruction operation by the first touch operation (double tap operation) having a lower possibility of causing an incorrect operation than that of the second touch operation which is a normal touch operation (such as a single tap operation or slide operation) among touch operations on the selfie pad 4b, the second operation method of performing an instruction operation by the second touch operation (single tap operation or slide operation), and the third operation method of making the second touch operation effective by performing an instruction operation by the second touch operation after performing the first touch operation. Accordingly, on condition that the first touch operation, which can reduce incorrect operations more than the second touch operation, is performed (the first state is switched to the second state), an instruction for performing a predetermined function can be made by the third operation method. Thus, even though the first touch operation is a relatively a burdensome operation, a plurality of operation methods selected in consideration of the reduction of incorrect operations can be used to perform instruction operations.

Yet still further, as instruction operations for the same function, a plurality of operation methods can be selected from among the first operation method, second operation method, and third operation method described above. Therefore, an operation method(s) in consideration of the reduction of incorrect operations can be selected.

Yet still further, the fourth operation method of making the second operation method effective by the above-described first operation method (first touch operation) and then making the second operation method ineffective by the first operation method (first touch operation) and the fifth operation method of making the second operation method effective by the first operation method (first touch operation) and then automatically making the second operation method ineffective when a predetermined time has elapsed by the above-described APO function can be selectively achieved. Therefore, switching between the first state and the second state can be manually or automatically performed, which is effective for preventing incorrect operations.

Yet still further, in an electronic apparatus including a first touch operation section (a touch operation section which constitutes the touch display section 6) arranged and laminated on a display section and a second touch operation (selfie pad 4b) arranged at a position different from that of the first touch operation section, a touch operation on the first touch operation section and a touch operation on the second touch operation section are detected, and instruction operations can be performed by a plurality of operation methods including the first operation method, second operation method, and third operation method described above among the various detected touch operations. As a result of this configuration, instruction operations can be performed by a plurality of operation methods while using the first touch operation section and the second touch operation section as appropriate.

(Second Embodiment)

A second embodiment of the present invention is described below with reference to FIG. 7 and FIG. 8.

In the above-described first embodiment, switching between the first state and the second state is made every time a double tap operation is performed on the selfie pad 4b as the above-described first touch operation. In the second embodiment, switching between the first state and the second state can be performed by a plurality of types of first touch operations, and a function to be performed in the second state is selected based on the type of a first touch operation at the time of switching from the first state to the second state. Here, sections that are basically the same or have the same name in both embodiments are given the same reference numerals, and therefore descriptions thereof are omitted herein. Hereinafter, characteristic portions of the second embodiment are mainly described.

FIG. 7 is a diagram for describing the selfie pad function table 3C of the second embodiment.

The selfie pad function table 3C of the second embodiment has fields of "mode", "function", "state transition touch operation", "touch operation to be detected", "processing to be performed", and "another relevant operator". That is, the second embodiment is structured to have "state transition touch operation" provided in place of "function to be performed" in the first embodiment. Descriptions of "mode", "function", "touch operation to be detected", "processing to be performed", and "another relevant operator" are omitted herein.

"State transition touch operation" is a first touch operation for giving an instruction to switch between the first state and the second state. In the example shown in the drawing, as a plurality of types of first touch operations (state transition touch operations), "triple tap (three taps)" which is three successive tap operations, and "quadruple tap (four taps)" which is four successive tap operations are stored in addition to "double tap". By setting a first touch operation of a different type for each "function" for each "mode" as "state transition touch operation" as described above, the control section 1 refers to the selfie pad function table 3C at the time of switching from the first state to the second state, and selects "function" of "mode" associated with the type of a first touch operation as a function to be performed in the second state.

That is, in "state transition touch operation" in the example shown in the drawing, "quadruple tap (four taps)", "triple tap (three taps)", and "double tap" have been stored as different types of first tap operations, corresponding to "release", "zoom adjustment", and "image processing" of "function" in "REC mode". Also, "triple tap (three taps)" and "double tap" have been stored as different types of first tap operations, corresponding to "image forwarding" and "enlarged display" of "function" in "PLAY mode". When the above-described first touch operation is performed, the control section 1 judges the type of the touch operation, and selects "function" of "mode" associated with "state transition touch operation" thereof.

FIG. 8 is a schematic operation diagram for describing the transition of the operation state of an imaging apparatus in the second embodiment.

First, in response to a power supply ON operation by the power supply key of the hard key 4a, the control section 1 causes a live view image to be displayed on the monitor screen (touch display section 6) in the REC mode, which is an initial state after a power supply ON operation (Step B1). In this state, by the mode key of the hard key 4a, switching can be performed between the REC mode and the PLAY mode, as with the first embodiment. In the PLAY mode, the control section 1 reads out a stored image and displays it on the replay screen (touch display section 6) (Step B2). Here, the control section 1 is in the first state (selfie pad restricted state) when a power supply ON operation is performed. When a touch operation performed on the selfie pad 4b is the above-described first touch operation (double tap, three taps, or four taps) different from the above-described second touch operation (single tap operation or slide operation) for giving an instruction to perform a predetermined function, the control section 1 makes the first touch operation effective. When the touch operation is the second touch operation, the control section 1 makes the touch operation ineffective.

Here, when a touch operation is performed on the selfie pad 4b in the first state and the touch operation is the above-described first touch operation, or in other words, one of a double tap operation (Step B3), a triple tap operation (Step B4), and a quadruple tap operation (Step B5), the control section 1 enters the second state (selfie pad restriction released state) (Step B6), and makes the second touch operation (single tap operation or slide operation) effective as a touch operation on the selfie pad 4b, in addition to the first touch operation.

Here, in accordance with the type of the first touch operation, the control section 1 refers to the selfie pad function table 3C, and selects "function" for each "mode" associated with "state transition touch operation". For example, when the first touch operation is a double tap operation (Step B3), the control section 1 selects "image processing" as "function" in the REC mode, and causes a live view image to be displayed on the monitor screen. In the PLAY mode, the control section 1 selects "enlarged display" as "function", and causes a captured image to be displayed on the replay screen (Step B7).

When the first touch operation is a triple tap operation (Step B4), the control section 1 selects "zoom adjustment" as "function" in the REC mode, and causes a live view image to be displayed on the monitor screen. In the PLAY mode, the control section 1 selects "image forwarding" as "function", and causes a captured image to be displayed on the replay screen (Step B8). Also, when the first touch operation is a quadruple tap operation (Step B5), the control section 1 selects "release" as "function" in the REC mode, and causes a live view image to be displayed on the monitor screen. However, the quadruple tap operation in the PLAY mode is made ineffective (Step B9).

In the second state (selfie pad restriction released state), when a single tap operation or a slide operation is performed as the second touch operation (Step B10, Step B11, and Step B12), the control section 1 refers to the selfie pad function table 3C, and performs processing indicated by "processing to be performed" associated with the type of the second touch operation from among "functions" selected for each "mode" (Step B13, Step B14, and Step B15), as with the above-described first embodiment. For example, when the selected function is "zoom adjustment" in the REC mode and the second touch operation is "upward slide operation", the processing of "zoom adjustment in a telescope direction" is performed. If the second touch operation is "downward slide operation", the processing of "zoom adjustment in a wide-angle direction" is performed.

On the other hand, when the first touch operation (double tap operation, triple tap operation, or quadruple tap operation) is performed in the second state (Step B16, Step B17, and Step B18), the control section 1 compares the first touch operation with the first touch operation (touch operation at Steps B3, B4, and B5) performed at the time of the switching from the first state to the second state, and judges whether these first touch operations are of the same type. Here, when the first touch operations are of the same type, the control section 1 makes a transition from the second state to the first state to return to the original screen at Step B2 described above. When the first touch operations are of different types, the control section 1 switches "function" while maintaining the second state.

For example, when the first touch operation for giving an instruction to switch from the first state to the second state is a double tap operation, if the first touch operation in the second state is a double tap operation of the same type, the control section 1 enters the first state (Step B2). If the first touch operation is a triple tap operation, which is of a different type, the control section 1 proceeds to Step B8 and performs switching to the function of "zoom adjustment" in the REC mode or to the function of "image forwarding" in the PLAY mode. Similarly, if the first touch operation is a quadruple tap operation, which is of a different type, the control section 1 proceeds to Step B9, and performs switching to the function of "release" in the REC mode, or makes the quadruple tap operation ineffective in the PLAY mode.

Similarly, when the first touch operation for giving an instruction to switch from the first state to the second state is a triple tap operation or a quadruple tap operation, if the first touch operation in the second state is an operation of the same type, the control section 1 enters the first state (Step B2). When the first touch operation is an operation of a different type, the control section 1 performs switching to "function" associated with the type of the performed first touch operation while maintaining the second state. On the other hand, in the second state, the control section 1 enters the first state to enter a power supply OFF state (Step B20) in accordance with a power supply OFF operation by the hard key 4a or the APO (auto power off) function (Step B19).

As described above, in the second embodiment, when the second touch operation is performed after switching to the second state is performed by the first touch operation of any type in a state where a function to be performed in accordance to the second touch operation in the second state has been set for each type of the first touch operations in association with "function" and "state transition touch operation" on the selfie pad function table 3C, a function associated with the second touch operation is performed. As a result of this configuration, switching between the first state and the second state can be performed by any of the plurality of types of first touch operations. Also, at the time of the switching from the first state to the second state, the function to be performed in the second state can also be selected in accordance with the type of the first touch operation. As a result of this configuration, the user can select a desired function only by changing the type of the first touch operation.

Also, when the first touch operation is performed in the second state, the first touch operation is compared with the first touch operation performed at the time of switching from the first state to the second state. When the first touch operations are of the same type, switching to the first state is performed. When the first touch operations are of different types, the function is switched while maintaining the second state. As a result of this configuration, when switching from the second state to the first state is to be performed, the function can be switched while maintaining the second state, only by performing the first touch operation of a type different from that performed at the time of switching from the first state to the second state, which further improves the usability.

(Third Embodiment)

A third embodiment of the present invention is described below with reference to FIG. 9 and FIG. 10.

In the above-described second embodiment, the double tap operation, the triple tap operation, and the quadruple tap operation are exemplarily described as the plural types of first touch operations. In the third embodiment, the plural types of first touch operations include double tap operations on different operation points on the selfie pad 4b. Here, sections in the third embodiment that are basically the same or have the same name as the first and second embodiments are given the same reference numerals, and therefore descriptions thereof are omitted. Hereinafter, characteristic portions of the third embodiment are mainly described.

FIG. 9 is a diagram for describing the selfie pad function table 3C of the third embodiment.

The selfie pad function table 3C of the third embodiment has fields of "mode", "function", "state transition touch position", "touch operation to be detected", "processing to be performed", and "another relevant operator". These fields are similar to those of the second embodiment except "state transition touch position", and therefore descriptions thereof are omitted herein. "State transition touch point" indicates double tap operation points on the selfie pad 4b as plural types of first touch operations. The selfie pad 4b is structured to have fifteen touch panels T arranged in one column as described above. The touch panels T are associated with contact numbers "1" to "15", respectively. When the user performs a touch operation on the selfie pad 4b with a finger (for example, an index finger or a middle finger) while holding the housing 11 by hand, the control section 1 detects a contact number based on an operation detection signal in accordance with the touched point.

In the example shown in the drawing, "contacts 1 to 5 (double tap 1)", "contacts 6 to 10 (double tap 2)", and "contacts 11 to 15 (double tap 3)" have been stored in "state transition touch position" as different types of first touch operations in association with "release", "zoom adjustment", and "image processing" of "function" in "REC mode". Also, "contacts 1 to 5 (double tap 1)" and "contacts 6 to 10 (double tap 2)" have been stored as different types of first touch operations in association with "image forwarding" and "enlarged display" of "function" in "PLAY mode". When the above-described first touch operation is performed, the control section 1 judges the type (operated point) of the first touch operation, and selects "function" of "mode" associated with "state transition touch position" thereof.

Figure 10:
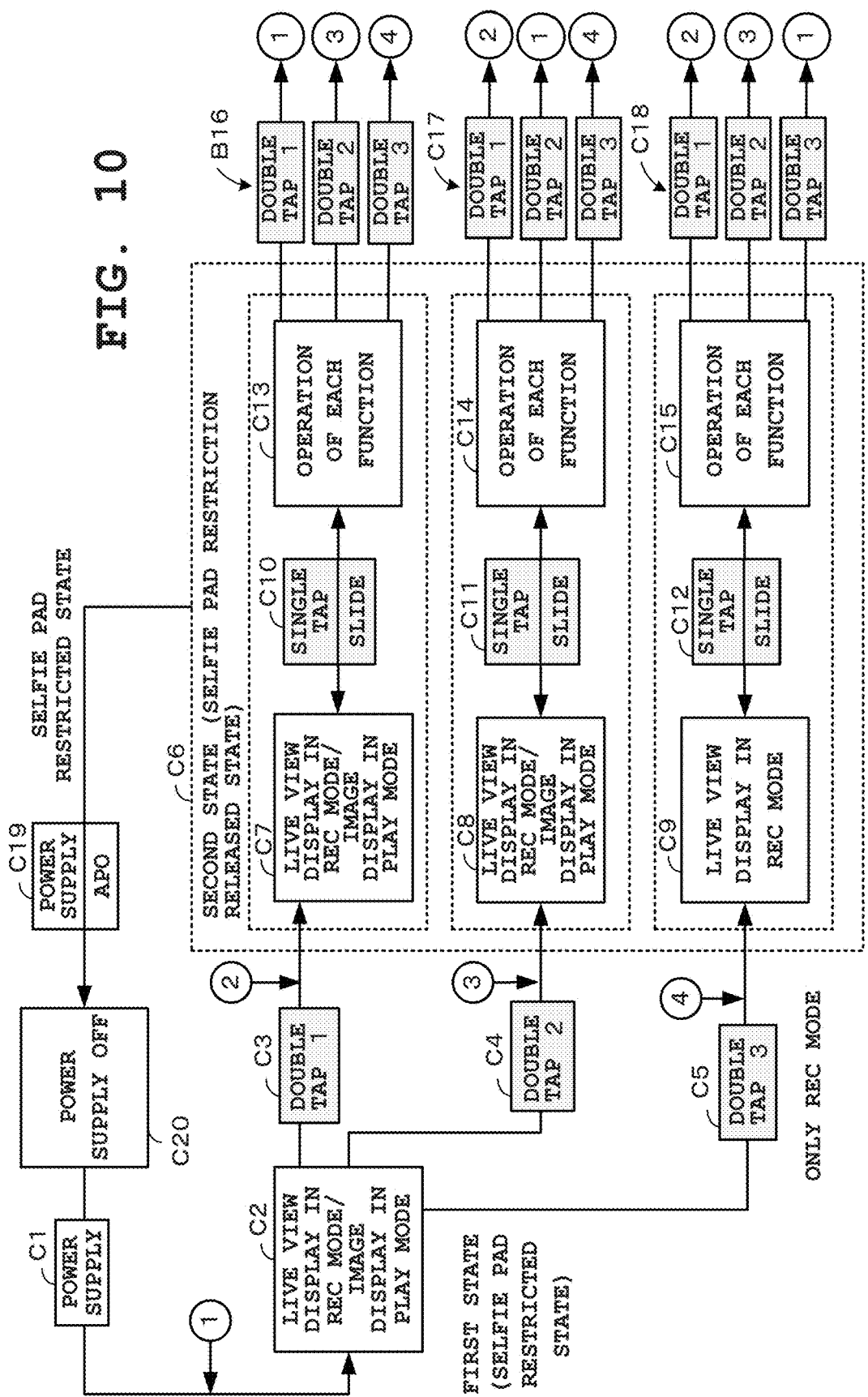
FIG. 10 is a schematic operation diagram for describing the transition of the operation state of the imaging apparatus in the third embodiment.

FIG. 10 is a schematic operation diagram for describing the transition of the operation state of an imaging apparatus in the third embodiment.

The operation of the third embodiment is basically the same as that of the second embodiment, and therefore only the characteristic portions thereof are described below. Step C1 to Step C17 of FIG. 10 are basically similar processing corresponding to Step B1 to Step B17 of FIG. 8 except that the types of first touch operations are different. Therefore, descriptions thereof are omitted herein.

In FIG. 10, "double-tap operation" in FIG. 8 has been changed to "contacts 1 to 5 (double tap 1)", "triple tap operation" in FIG. 8 has been changed to "contacts 6 to 10 (double tap 2)", and "quadruple tap operation" in FIG. 8 has been changed to "contacts 11 to 15 (double tap 3)". When the above-described second touch operation is performed after switching to the second state is performed by any one of the plural types of first touch operations (first touch operation on any operation point), the control section 1 selects a function associated with the second touch operation, and performs this function.

As described above, in the third embodiment, when the second touch operation is performed after switching to the second state is performed any one of the plural types of first touch operations (first touch operation on any operation point) in a state where a function to be performed in accordance with the second touch operation in the second state has been set for each type (operated point) of first touch operations in association with "function" and "state transition touch position" on the selfie pad function table 3C, a function associated with this second touch operation is performed. As a result of this configuration, a function to be performed in the second state can be selected in accordance with the type (operated point) of the first touch operation when the first state is switched to the second state. Accordingly, even when performing the same type of double-tap operation, the user can select a desired function in accordance with a point to be double-tapped on the selfie pad 4b.

Also, when the first touch operation is performed in the second state, the first touch operation is compared with the first touch operation performed at the time of switching from the first state to the second state. When the first touch operations are of the same type (operated point), switching to the first state is performed. When the first touch operations are of different types (operated points), the function is switched while maintaining the second state. As a result of this configuration, when switching from the second state to the first state is to be performed, the function can be switched while maintaining the second state, only by performing the first touch operation of a type (operated point) different from that performed at the time of switching from the first state to the second state, which improves the usability.

In each of the above-described embodiments, "double tap", "triple tap", "quadruple tap", "contacts 1 to 5 (double tap 1)", "contacts 6 to 10 (double tap 2)", and "contacts 11 to "double tap 3)" have been exemplarily described as first touch operations. However, five consecutive taps (five taps) and the like may be included. Also, for example, each tap in three taps may be performed not at regular intervals but at varied tap intervals. That is, the first touch operation may be any operation as long as it is a touch operation other than a single tap which has a high possibility of causing an incorrect operation, and an arbitrary first touch operation may be set.

Also, a sampling period for detecting a touch operation on the selfie pad 4b may be set differently for the first state and the second state. For example, a sampling period in the first state where only the first touch operation is effective may be set slower than a sampling period in the second state where the first and second touch operations are effective so that power saving can be achieved.

Moreover, in each of the above-described embodiments, the selfie pad 4b is arranged on one side portion of the housing 11. However, the selfie pad 4b may be arranged on, for example, a back surface portion of the housing 11 which is a portion difficult for the user to visually recognize in normal operations.

Furthermore, in each of the above-described embodiments, the present invention has been exemplarily applied in an imaging apparatus (digital camera) that is an electronic apparatus. However, the present invention may be applied in a personal computer, a PDA (Personal Digital Assistance), a tablet terminal, a portable telephone such as a smartphone, an electronic game machine, a music player, and the like.

Furthermore, the "apparatuses" and "sections" described in each of the above-described embodiments are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An electronic apparatus equipped with a touch operation section and a display section, the electronic apparatus comprising:

a processor that is configured to:

judge a type of a touch operation performed on the touch operation section, the type of the touch operation being one of a first touch operation on the touch operation section and a second touch operation on the touch operation section that is different from the first touch operation;

perform switching between a first state where a predetermined function capable of being performed by the touch operation performed on the touch operation section is restricted from being performed and a second state where restriction of the predetermined function is released; and determine whether a state of the electronic apparatus is the first state or the second state, wherein the switching includes (i) first switching in which, when the state of the electronic apparatus is determined to be the first state and a type of a touch operation is judged to be the first touch operation, the state of the electronic apparatus is switched from the first state to the second state, and in which, when the state of the electronic apparatus is determined to be the first state and a type of a touch operation is judged to be the second touch operation, the electronic apparatus does not perform the predetermined function associated with the second touch operation, and (ii) second switching in which, when the state of the electronic apparatus is determined to be the second state and a type of a touch operation is judged to be the first touch operation, the state of the electronic apparatus is switched from the second state to the first state, and in which, when the state of the electronic apparatus is determined to be the second state and a type of a touch operation is judged to be the second touch operation, the electronic apparatus performs the predetermined function associated with the second touch operation, wherein the processor selects the predetermined function associated with the second touch operation from among a plurality of functions, wherein some of the plurality of selectable functions can be operated only by the touch operation section, and remaining ones of the functions can be operated by the touch operation section and another operation section, and wherein the processor controls whether or not display of an icon, which indicates that restriction of a function operable by the touch operation section is released and which is temporarily not displayed in response to detection of a predetermined operation by the touch operation section, is performed on the display section in order to identify whether a current state of the electronic apparatus is the first state or the second state.

2. The electronic apparatus according to claim 1, wherein the processor (i) further judges, from among plural types of first touch operations, a type of a first touch operation performed when the first state is switched to the second state, (ii) sets the predetermined function associated with the second touch operation in the second state for each of the types of the first touch operations, and (iii) performs the set predetermined function in accordance with the judged type of the first touch operation when the second touch operation is detected in the second state.

3. The electronic apparatus according to claim 2, wherein the processor judges the type of the first touch operation based on a position of the first touch operation on the touch operation section.

4. The electronic apparatus according to claim 2, wherein the processor (i) further judges a type of a first touch operation performed in the second state, (ii) compares the judged type of the first touch operation with the type of the first touch operation judged at a time of switching from the first state to the second state, when the first touch operation is detected in the second state, and (iii) controls to switch to the first state when the first touch operations are of a same type, or to switch the predetermined function associated with the second touch operation to a set function associated with the type of the first touch operation performed in the second state while keeping the second state, when the first touch operations are of different types.

5. The electronic apparatus according to claim 1, wherein the processor controls such that a different sampling period for detecting a touch operation performed on the touch operation section is set for each of the first state and the second state.

6. The electronic apparatus according to claim 1, wherein the electronic apparatus is a portable electronic apparatus, and the touch operation section is arranged on a side surface of a housing of the portable electronic apparatus so as to come in contact with a part of a body of a user when the user viewing a display section holds the housing of the portable electronic apparatus.

7. The electronic apparatus according to claim 6, wherein the housing of the portable electronic apparatus includes a main body block including the display section and a frame block rotatably attached to one end of the main body block, and wherein the touch operation section is arranged on a side surface of the frame block.

8. A touch operation control method for an electronic apparatus equipped with a touch operation section and a display section, the method comprising:

judging a type of a touch operation performed on the touch operation section, the type of the touch operation being one of a first touch operation on the touch operation section and a second touch operation on the touch operation section that is different from the first touch operation;

performing switching between a first state where a predetermined function capable of being performed by the touch operation performed on the touch operation section is restricted from being performed and a second state where restriction of the predetermined function is released;

determining whether a state of the electronic apparatus is the first state or the second state; and controlling whether or not display of an icon, which indicates that restriction of a function operable by the touch operation section is released and which is temporarily not displayed in response to detection of a predetermined operation by the touch operation section, is performed on the display section in order to identify whether a current state of the electronic apparatus is the first state or the second state, wherein the switching includes (i) first switching in which, when the state of the electronic apparatus is determined to be the first state and a type of a touch operation is judged to be the first touch operation, the state of the electronic apparatus is switched from the first state to the second state, and in which, when the state of the electronic apparatus is determined to be the first state and a type of a touch operation is judged to be the second touch operation, the electronic apparatus does not perform the predetermined function associated with the second touch operation, and (ii) second switching in which, when the state of the electronic apparatus is determined to be the second state and a type of a touch operation is judged to be the first touch operation, the state of the electronic apparatus is switched from the second state to the first state, and in which, when the state of the electronic apparatus is determined to be the second state and a type of a touch operation is judged to be the second touch operation, the electronic apparatus performs the predetermined function associated with the second touch operation, wherein the predetermined function associated with the second touch operation is selected from among a plurality of functions, and wherein some of the plurality of selectable functions can be operated only by the touch operation section, and remaining ones of the functions can be operated by the touch operation section and another operation section.

* * * * *